Sept. 22, 1959 L. R. PORRATA ET AL 2,905,614

PHONOGRAPH RECORD PLATING FIXTURE

Filed June 18, 1953 2 Sheets-Sheet 1

INVENTORS
Louis R. Porrata
BY Erik A. Porterfield
Pennie, Edmonds, Morton, Barrows and Taylor
ATTORNEYS INVENTORS
Louis R. Porrata
BY Erik A. Porterfield Edmonds, Morton, Barrows and Taylor
ATTORNEYS United States Patent Office 2,905,614

Patented Sept. 22, 1959

2,905,614

PHONOGRAPH RECORD PLATING FIXTURE

Louis R. Porrata, Cliffside Park, N.J., and Erik A. Porterfield, Tuckahoe, N.Y., assignors, by mesne assignments, to Columbia Broadcasting System, Inc., New York, N.Y., a corporation of New York Application June 18, 1953, Serial No. 362,496

11 Claims. (Cl. 204—281)

This invention relates to the manufacture of disk phonograph records and more particularly to the manufacture of the negative matrices or stampers from which such records are formed by a molding or pressing operation. The invention provides a method and means whereby such stampers, which are produced by a process of electroplating, possess a center hole accurately concentric with the sound spiral thereon. Such a concentric center hole is useful in properly positioning the stampers in the record pressing or molding machines, to the end that the finished records may in turn have center holes concentric with their sound grooves. The invention also provides means which facilitate the separation of each pair of electrodeposited metallic plates from its parent in the series extending from the first metal plate deposited on the original lacquer or acetate record to the stamper.

In disk phonograph records it is essential that the spiral sound groove and the center hole of the record be concentric. The accuracy with which this condition is met is determined largely by the degree of concentricity between the negative version of the spiral sound groove on the stamper and the center hole in the stamper, by which in part the stamper is located in the record press. By the very nature of the cutting operation, the spiral groove produced on the acetate record in the original recording process is concentric with that acetate record as it is rotated on the turntable of the cutting lathe and with the center hole of that record by which it is centered on that turntable. According to the procedure heretofore employed however, the position of the center hole in the original record with respect to the sound spiral has been lost in the formation of the derivative electroplates. It has therefore been necessary to refinish the center section of the stampers and to punch them with center holes located concentrically of their sound spirals by a careful process of adjusting the stamper on a turntable having no center post until the sound groove is seen to run true.

The present invention obviates the necessity for this practice and provides an electroplated stamper whose center hole is accurately concentric with the spiral sound "groove" formed in relief thereon.

The invention will now be described in further detail by reference to the accompanying drawings in which.

Figures 1, 2, 3, 4:
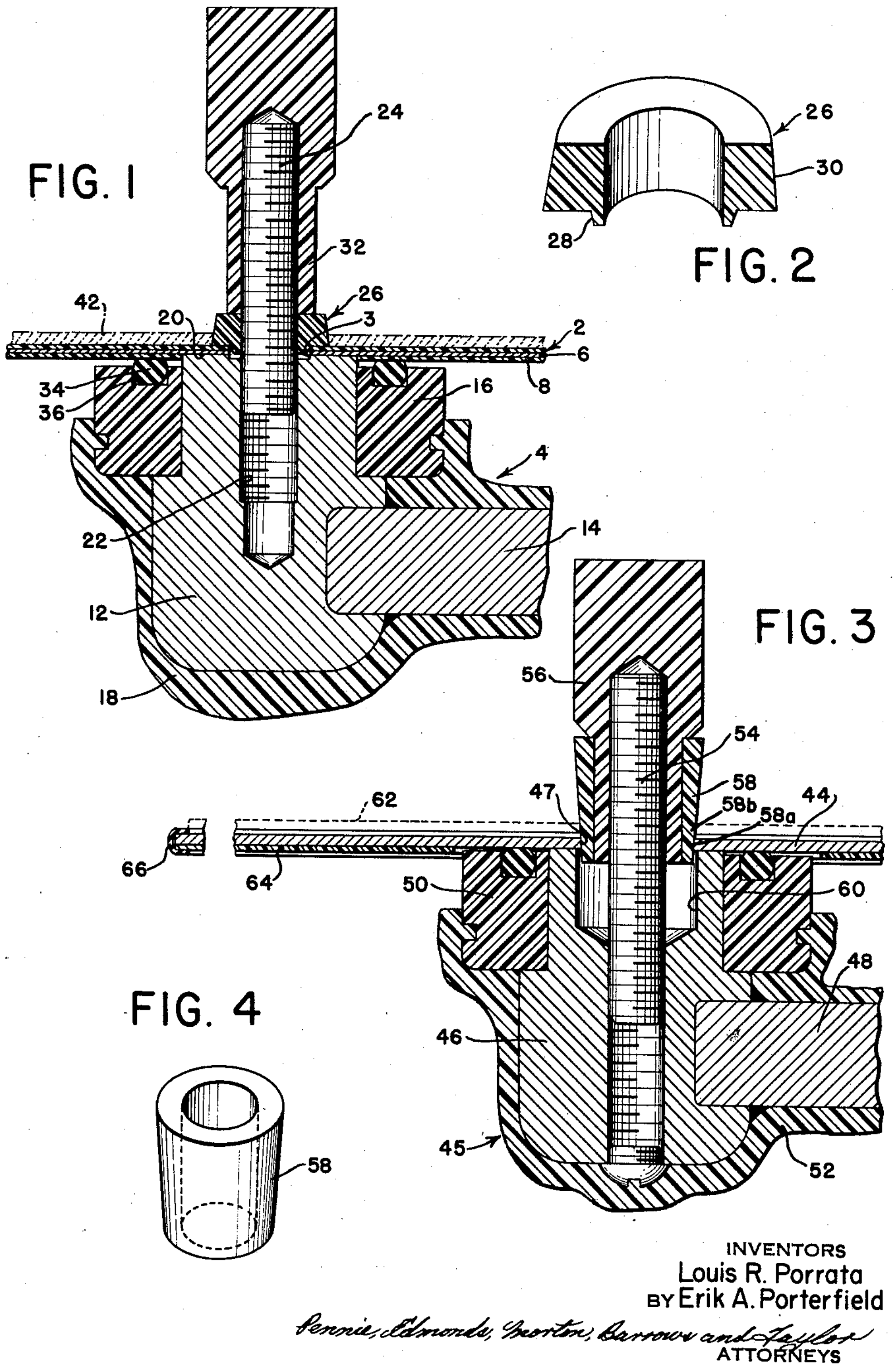
Fig. 1 is a sectional view through a plating fixture according to the invention, used for the production of "metal master" negative plates or records by electrodeposition directly on the original cut records of lacquer, acetate or similar materials into which a spiral sound groove is cut by a recording stylus.
Fig. 2 is a perspective sectional view of a shouldered bushing employed in the fixture of Fig. 1 for the development in the metal master plates of a center hole concentric with the sound spiral.
Fig. 3 is a sectional view of a plating fixture according to the invention for use in the production of the positive "mother" plates from the negative metal master plates developed by electrodeposition on the plating fixture of Fig. 1, and for use in the production of other derivative plates including the negative "stamper" plates used in making the disk phonograph records of commerce.
Fig. 4 is a perspective view of a nonconductive sleeve employed in the fixture of Fig. 3 to assure in the plates formed therewith concentricity of the center holes with their sound spirals.

Fig. 1 illustrates the formation of a negative metal master record from a sound recording on an original or "master" record having an acetate or similar soft surface into which a spiral sound groove has been cut. An original record 2, hereinafter referred to for convenience as an acetate record, is shown fragmentarily, and has a spiral sound groove cut in its upper face concentrically of its center hole 3. The record 2 is shown fastened to a plating fixture generally indicated at 4 as assembled therewith for the production thereon by electrodeposition of a metal master negative plate. The record 2 may comprise a disk 6 of aluminum coated on both sides with a thin layer 8 of acetate or the like into which on one side the spiral sound groove is cut. The sound groove is concentric with the central hole 3 in the record 2 by virtue of the fact that the record was centered at the hole 3 in the cutting process. In Fig. 1 the record is supported on a plating fixture 4, termed a "master stick" in the industry, in order to serve as the cathode in a plating bath. The master stick comprises a master stick nut 12 and conductor bar 14 of conducting material, usually copper, and a stick nut sleeve 16 of insulating material. The stick nut and conductor bar are coated over with a nonconducting coating 18 to prevent the formation of a metallic deposit thereon. The nut is provided with a plane record plate supporting surface 20 at which in the process of the invention electrical contact is made between the master stick and the master record plate 2 at its metallic core 6. The nut is provided with a threaded bore 22 perpendicular to the surface 20 for the accommodation of a stud 24, having an insulating head 32 by means of which in conjunction with an insulating bushing 26 the master record is drawn into contact with the face 20 of the nut.

As illustrated in Fig. 2 the bushing 26, which is of electrically nonconductive material, may be provided with a slightly tapered or conical central portion or section 28 whose largest diameter corresponds closely to that of the hole in the master record. It is further provided with an approximately cylindrical plating mold portion or section 30, which may be slightly tapered as shown in Fig. 2, coaxial with and of greater diameter than the section 28, which determines the diameter of the hole formed in the metal master plate deposited electrolytically on the master record 2. As indicated in Fig. 1, the bushing 26 fits against the head 32 of the stud 24.

A rubber ring 34 may be provided to fit in a groove 36 cut in the stick nut sleeve. When the master record is drawn down against the nut by means of the stud 24 and bushing 26, the ring 34 forms a seal between the sleeve and master record, preventing the plating solution from penetrating to the face of the nut.

Preliminary to the assembly of the master record into the fixture of Fig. 1, its upper face is rendered electrically conducting, for example by the deposit thereon of a very then layer of metallic silver by methods which are well known in the art. An electrically continuous path to this conducting surface is provided by scraping away from the central portion of the underface of the record the lacquer coating, so as to expose the metallic disk 6 to the contact face 20 of the nut, and at the edge of the record the acetate is broken away in order to provide conduction between the metal disk 6 and the silver layer.

The bushing 26 is dimensioned so that the maximum diameter of its conical portion 28 is matched to the diameter of the center hole 3 in the record 2. Accordingly the shoulder 30 lies flush with the upper surface of the record 2 and is accurately coaxial with the center hole 3 and with the spiral sound groove of the master record.

The assembly of fixture and master record shown in Fig. 1 may then be supported in a tank of electrolyte for plating operations according to known methods to lay down on the upper face of the record 2 an electroplate or metal master negative plate having a total thickness of the order of 0.050 inch. This may include an initial plating with nickel followed by one or more platings with copper which may proceed at different current densities. The metal master record 42 so formed is shown in dashed lines in Fig. 1 and has a central hole of the diameter of the shoulder 30 on bushing 26, accurately concentric with the negative spiral record ridge thereon.

When the metal master record 42 has acquired the necessary thickness, the fixture is removed from the plating bath, and the adhering master record 2 and metal master 42 are removed therefrom and separated from each other. Because of the plastic nature of the surface of the master record 2, this separation may usually be easily accomplished with hand tools. The metal master record itself may then be trimmed to a desired outer diameter in a punch press of the type illustrated in Fig. 5.

As will be presently described this press has the advantage of cutting a circular outer edge which is concentric with the center hole of the plate or plates which are placed therein, and which is hence concentric with the spiral sound grooves of those plates.

The metal master record 42 carries a negative impression of the spiral sound groove in relief thereon. It is not usually itself used however for the pressing of phonograph records. Instead one or more positive plates termed mothers are plated therefrom, and negative stampers or matrices are in turn plated from the mother plates. When a large number of records are to be manufactured, still other intermediate plates may be made with the apparatus of the invention to permit the production of a large number of stampers.

The production of the mother plate or plates from the metal master plate 42 and of the stampers or submaster and other plates from the mothers is carried out according to the preferred practice of the invention with the help of a plating fixture closely similar to that illustrated in Figs. 1 and 2. According to the preferred practice of the invention however the size of the central hole in each of these plates derived from the metal master is maintained close to the size of the center hole in the metal master itself by substituting for the shouldered bushing 26 illustrated in Figs. 1 and 2 a conical bushing having a small taper just sufficient to retain against the plating stick the parent plate on which a derivative plate is to be formed. Referring to Fig. 3, a plating fixture generally indicated at 45 and which may be termed a "matrix stick" supports a metallic plate 44, which may be either a negative or a positive plate, e.g. a metal master or a mother plate. The matrix stick 45 comprises a nut 46, a conductor bar 48, an insulating sleeve 50, an insulating coating 52, a stud 54 having a head 56, and a tapered insulating sleeve or bushing 58. The plate 44 is supported on the matrix stick in contact with the nut 46 for use again as the cathode of a plating bath or baths as required for the desired composition of the plate to be laid down. The plate 44 is stressed against the nut by means of the conical sleeve or bushing 58 of nonconducting material which is drawn down against the plate by means of a stud 54 having an insulating head 56. Thus, one section 58*a* of the bushing 58 is within the center hole of the plate 44 while another section 58*b* contiguous with and of greater diameter than the section 58*a* urges the plate 44 against the nut 46. The nut 46 is cut away at 60 as by means of a boring operation in order to provide clearance for the sleeve 58. The center hole 47 in the plate 44, defined in a previous plating operation by the shoulder or plating mold 30 of the bushing 26 in case the plate 44 is a metal master or by means of the sleeve 58 in case of a plate 44 which is itself derivative from a metal master, is concentric with the sound spiral of plate 44, positive or negative as the case may be. Consequently the hole defined by the sleeve 58 in the new plate which is deposited on plate 44 will be similarly concentric with the sound spiral, positive or negative, which is formed in the new plate. The plate deposited on the plate 44 is shown fragmentarily in dotted lines at 62 in Fig. 3.

To prevent the formation of a metallic coating on the back of the plate 44, there may be assembled therewith an annular disk 64 of insulating material, held against the plate 44 by means of a rubber snap ring 66. It is desirable however to begin the laying down of the new plate 62 without the ring 64, in order to insure good formation of the new plate out to substantially the entire diameter of the plate 44.

When the new plate 62 has acquired the desired thickness, the assembly shown in Fig. 3 is removed from the plating bath, and the adhering pair of plates 44 and 62 are disassembled from the matrix stick to be "stripped" or separated.

Figure 5:
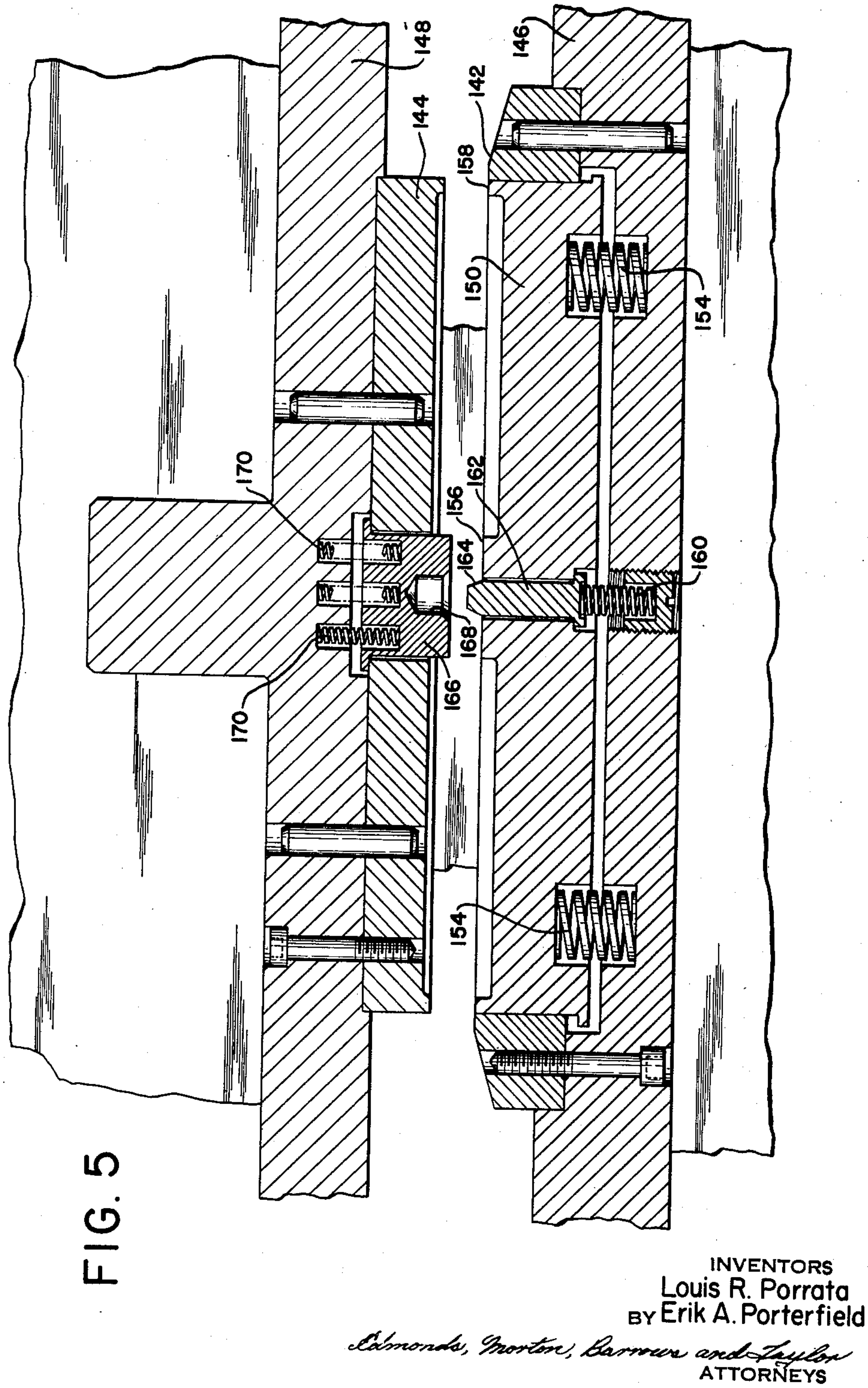
Fig. 5 is a fragmentary sectional view in elevation of a punch press according to the invention used in the separation or "stripping" of parent and derivative plates.

According to another feature of the present invention the center holes in the electrodeposited metal plates are used to trim concentrically thereto the edges of each pair of joined plates at the end of the plating operation by which the derivative plate of the pair is produced. Such trimming additionally facilitates separation of the members of such pairs. Fig. 5 shows in cross section a punch press employed for these purposes. The press of Fig. 5 includes a fixed die 142 and a movable die 144. The fixed die rests in a base member 146, and the movable die is supported for up and down motion in an upper die half 148. A stripper pad 150 fits within the fixed die 142 and is supported on compression springs 154 for limited motion with respect to the base member. The stripper pad has a central annular plane surface 156 and an outer annular surface 158 coplanar therewith against which the pair of electroplates to be trimmed and stripped are stressed just prior to the actual shearing operation performed by the press. The base member likewise supports via a compression spring 160 a pin 162 which fits within a hole in the stripper pad concentric thereof and of the circular fixed die 142. The upper end of the pin 162 has a tapered end portion 164 the maximum and minimum diameters of which are respectively greater and less than the maximum and minimum diameters of the center hole of the pair of metallic plates to be stressed or separated.

The upper die half includes a central locking pad 166 having the same outer diameter as the central annular surface 156 of the stripper pad and having a central bore 168 large enough to accommodate the centering pin 162. The pad 166 is supported from the upper die half by means of compression springs 170 which when unstressed support the pad 166 with its lower face below the cutting edge of the upper die 144. The spring 160 supporting the pin 162 is made weaker than the combined strength of springs 170, and the combined strength of springs 170 is in turn less than the combined strength of the springs 154 which support the stripper pad 150 in the female die.

A pair of plates to be trimmed when inserted into the press centers itself on the pin 162. When the press is closed, the pad 166 descends and contacts the pair of plates suspended on pin 162. As the dies continue to approach each other, pin 162 is first depressed until the pair of plates lies flat on the stripper pad 150. Continued approach of the die halves then forces the pad 166 back into the upper die half until the die halves come together and shear the pair of plates along a circular edge concentric with the center hole thereof on pin 162. When the press is opened again, the stripper pad 150 rises under the influence of springs 154 and ejects the sheared plates from the press.

Upon removal from the press the positive and negative combination, metal master and mother or mother and stamper plates as the case may be, may be readily separated at their interface exposed at the sheared edge produced by the press.

While the invention has been described in terms of applicants' presently preferred practice, numerous changes are possible within the scope of the invention as set forth in the appended claims. For example, with acetate record disks having a center hole of sufficient size, the fixture of Fig. 3 may be used directly, with the conically tapered bushing of Fig. 4 instead of the shoulder bushing of Fig. 2.

We claim:

1. An electroplating fixture comprising an annular phonograph record plate on which a metal master record is to be electroplated, said record plate having a center hole, a metallic nut, a plane supporting surface on the nut supporting the record plate, a stud anchored in the nut and extending therefrom coaxial with the record plate center hole, said stud being perpendicular to the plane record plate supporting surface, an electrically nonconductive bushing coaxial with the stud and holding the record plate against the supporting surface, said bushing having two coaxial sections, the first bushing section being within the record plate center hole, the second bushing section being of larger diameter than the first bushing section and contiguous therewith, at least one of the outer surfaces of the coaxial bushing sections being tapered, an annular edge formed by the record plate center hole and the unsupported surface of the record plate, the juncture of the two coaxial bushing sections engaging said annular edge, the second section forming a plating mold determining the size of the hole in the metal master record, whereby the metal master record center hole will be coaxial with the center hole in the annular phonograph record plate, means including the stud for relatively moving the bushing and the nut to urge the record plate against the supporting surface, and means to support the nut in a plating bath.

2. Apparatus as defined in claim 1, wherein the second coaxial section of the bushing forms a shoulder holding the record plate in position on the nut.

3. Apparatus as defined in claim 1, wherein the bushing has a conical exterior surface tapering towards the nut and holding the record plate in position on the nut.

4. Apparatus as defined in claim 1, in which an electrically nonconductive coating covers the nut except at the record plate supporting surface.

5. Apparatus as defined in claim 1, in which an annular recess in the supporting surface on the nut coaxial with the stud is provided.

6. An electroplating fixture comprising an annular phonograph record plate on which a metal master record is to be electroplated, said record plate having a center hole, a metallic nut having a threaded bore, a plane record plate supporting surface on the nut perpendicular to its threaded bore, means supporting an annular electrically nonconductive gasket that surrounds the nut and extends when unstressed beyond the plane of the record plate supporting surface, said gasket engaging and being compressed by the record plate as it is urged against the record plate supporting surface, a stud having a smaller diameter than the record plate center hole anchored in and extending from the threaded bore of the nut, an electrically nonconductive bushing holding the record plate against the supporting surface and the gasket, said bushing being coaxial with the stud and having two coaxial sections, the first bushing section being within the record plate center hole, the second bushing section being of larger diameter than the first bushing section and contiguous therewith, an annular edge formed by the record plate center hole and the unsupported surface of the record plate, the juncture of the two coaxial bushing sections engaging said annular edge, the second section forming a plating mold determining the size of the hole in the metal master record, whereby the metal master record center hole will be coaxial with the center hole in the annular phonograph record plate, means including the stud for relatively moving the bushing and the nut to urge the record plate against the supporting surface, and means to support the nut in a plating bath.

7. Apparatus as defined in claim 6, wherein said supporting means for the gasket includes an electrically nonconductive sleeve surrounding the nut adjacent to the record plate supporting surface, said sleeve being formed with an annular channel receiving said gasket.

8. Apparatus as defined in claim 6, wherein the second coaxial section of the bushing forms a shoulder holding the record plate in position on the nut.

9. Apparatus as defined in claim 6, wherein said bushing has a conical exterior surface tapering toward the nut and holding the record plate in position on the nut.

10. Apparatus as defined in claim 6, in which an electrically nonconductive coating covers the nut except at the record plate supporting surface.

11. Apparatus as defined in claim 6, in which an annular recess in the supporting surface on the nut coaxial with the stud is provided.

References Cited in the file of this patent

UNITED STATES PATENTS

| | | |
|---|---|---|
| 102,077 | Adams | Apr. 19, 1870 |
| 817,611 | Agar | Apr. 10, 1906 |
| 836,646 | McDonald | Nov. 20, 1906 |
| 1,534,918 | Claybourn | Apr. 21, 1925 |
| 2,181,490 | Lowe | Nov. 28, 1939 |
| 2,349,356 | LaMotte | May 23, 1944 |
| 2,368,749 | Dowling et al. | Feb. 6, 1945 |
| 2,389,904 | Hampson | Nov. 27, 1947 |
| 2,675,348 | Greenspan | Apr. 13, 1954 |
| 2,776,941 | Wagner | Jan. 8, 1957 |

FOREIGN PATENTS

| | | |
|---|---|---|
| 126,031 | Sweden | Sept. 6, 1949 |

OTHER REFERENCES

Ser. No. 290,026, Weiner (A.P.C.), published July 13, 1943.